(12) United States Patent
Wang

(10) Patent No.: US 6,406,597 B1
(45) Date of Patent: Jun. 18, 2002

(54) WATER DISTILLING DEVICE

(76) Inventor: Chi-Hsiang Wang, No. 20, Lane 16, Tai Sung St, Taipei (TW)

( * ) Notice: Subject to any disclaimer, the term of this patent is extended or adjusted under 35 U.S.C. 154(b) by 0 days.

(21) Appl. No.: 09/450,457

(22) Filed: Nov. 29, 1999

Related U.S. Application Data

(60) Provisional application No. 60/114,012, filed on Dec. 29, 1998.

(51) Int. Cl.⁷ .............................. B01D 3/02; B01D 3/42; C02F 1/04
(52) U.S. Cl. .................... 202/181; 202/197; 202/185.3; 202/185.5; 202/206; 203/1; 203/10; 203/40
(58) Field of Search ............................... 202/185.3, 206, 202/83, 185.5, 181, 197; 203/1, 2, 10, 40, DIG. 18, 100; 159/44; 96/189, 220

(56) References Cited

U.S. PATENT DOCUMENTS

| | | | | |
|---|---|---|---|---|
| 4,269,663 A | * | 5/1981 | McFee | 202/83 |
| 4,622,102 A | * | 11/1986 | Diebel | 202/185.3 |
| 4,818,344 A | | 4/1989 | Glucksman | 202/185.3 |
| 5,290,402 A | * | 3/1994 | Tsai | 203/10 |
| 5,492,602 A | * | 2/1996 | Volgelman et al. | 202/206 |
| 5,536,375 A | * | 7/1996 | Vogelman | 203/2 |
| 5,609,732 A | * | 3/1997 | Magidson | 203/DIG. 18 |
| 5,662,779 A | * | 9/1997 | Greene et al. | 202/185.5 |
| 5,762,762 A | * | 6/1998 | Breithaupt et al. | 202/185.3 |
| 6,030,504 A | * | 2/2000 | Belongia et al. | 202/206 |

* cited by examiner

*Primary Examiner*—Virginia Manoharan
(74) *Attorney, Agent, or Firm*—Francis Marino

(57) ABSTRACT

A distilling device for converting unprocessed water into pure water including a fill tank, a base having a removable water tray with a boiling chamber therein for holding the unprocessed water, a removable mist chamber disposed above the base and having a heater depending therefrom into the boiling chamber to boil the unprocessed water and to convert it into a purified steam which rises into a condensation coil where a fan cools the coil and steam, causing the steam to condense into purified water and flow into a reservoir tank which also functions as a serving pitcher.

4 Claims, 15 Drawing Sheets

WATER DISTILLING DEVICE

This application claims the benefit of provisional application No. 60/114,012 filed Dec. 29, 1998.

FIELD OF THE INVENTION

The present invention is a distilling device for converting unprocessed water into pure water for purposes such as drinking. More specifically, it is a low-cost, environmentally friendly and energy efficient electrical distilling appliance which distills water without the need for a compressor, a refrigeration coil, or refrigerant for compressing and re-condensing.

OBJECTS OF THE INVENTION

It is an object of the invention to provide an inexpensive water distilling device which does not require refrigerant or a refrigeration system.

It is a further object to provide such a distiller which uses less energy in the purification process and is thereby less expensive to operate than conventional distillers.

It is a further object to provide such a distiller which is environmentally friendly by foregoing the need for CFC-based refrigerants.

It is a further object to provide such a distiller which is more reliable, safer, and less prone to leakage than conventional distillers.

It is a further object to provide such a distiller which is easier to clean than conventional distillers.

SUMMARY OF THE INVENTION

The present invention comprises;
1) A fill tank for holding unprocessed water prior to the distillation process and for providing said water to the process,
2) a base having a removable water tray for accepting in-process water from the fill tank and to ease clean-up, the water tray having;
  a) a boiling chamber for boiling the in-process water,
  b) a labyrinth channel surrounding the boiling chamber for pre-warming the in-process and pre-evaporating volatile impurities therefrom,
3) a mist chamber having;
  a) a heater to boil the in-process water in the boiling chamber of the water tray and convert the in-process water to purified mist consisting of steam and water vapor,
  b) a mist chimney and a mist tube for collecting the rising steam and water vapor and channeling it into a condensation coil,
  c) the aforementioned condensation coil for causing purified water from the mist tube to condense therein as it is cooled within the coil by a cooling fan, and
  d) the aformentioned cooling fan for pulling cool outside air into the mist chamber and across the condensation coil for coiling said condensation coil, and for exhausting the aforementioned pre-evaporated impurities,
4) a reservoir tank for collecting the purified water which flows from the condensation coil and for use as a serving pitcher of the purified water, and
5) a safety system for preventing inadvertent operation of the heater.

BRIEF DESCRIPTION OF THE DRAWINGS

Reference to the included drawings will assist in understanding the invention, in which.

DESCRIPTION OF THE PREFERRED EMBODIMENT OF THE INVENTION

Figure 1:
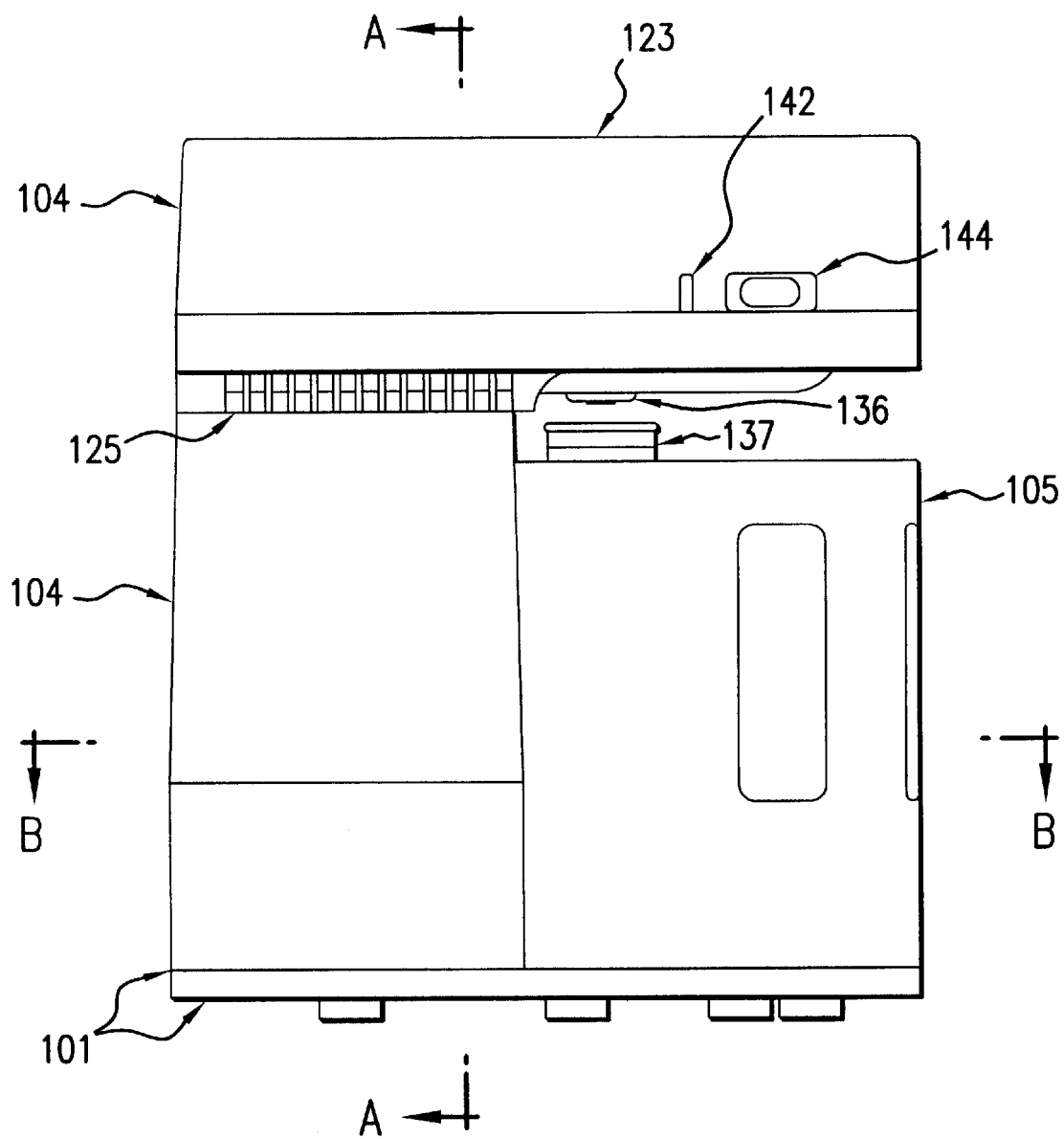
FIG. 1 is a front view of a preferred embodiment of the invention.
Figure 2:
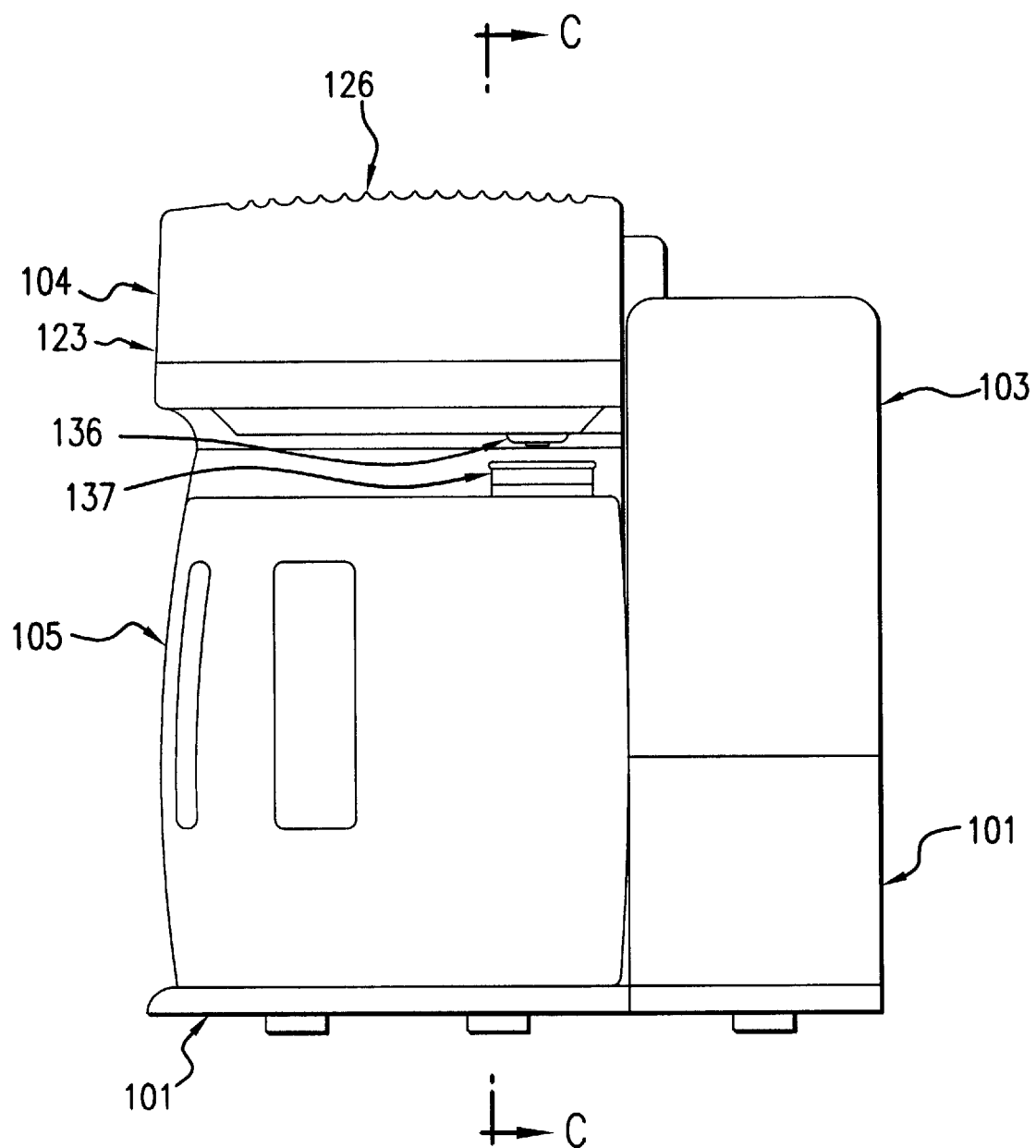
FIG. 2 is a right-side view of the embodiment of FIG. 1.
Figure 3:
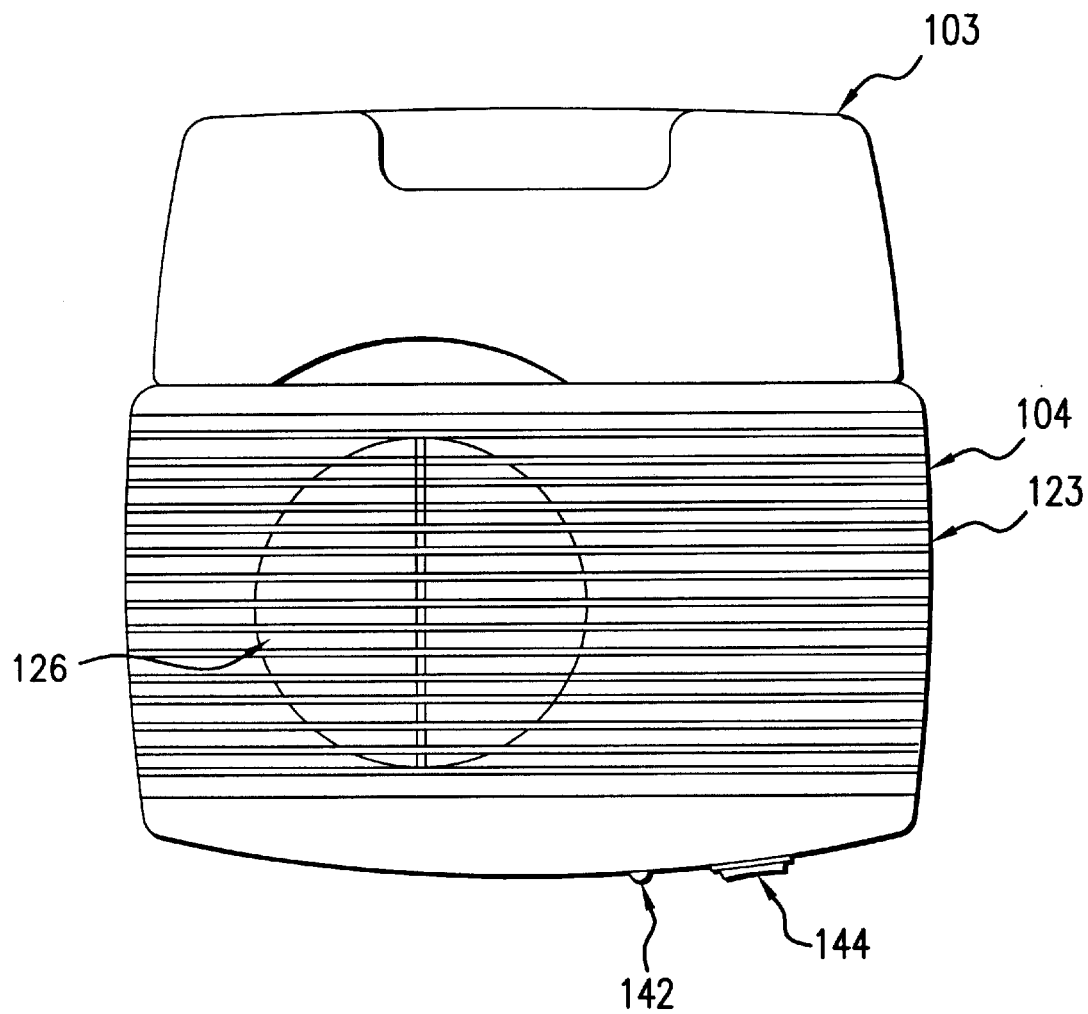
FIG. 3 is a top view of the embodiment of FIG. 1.
Figure 4:
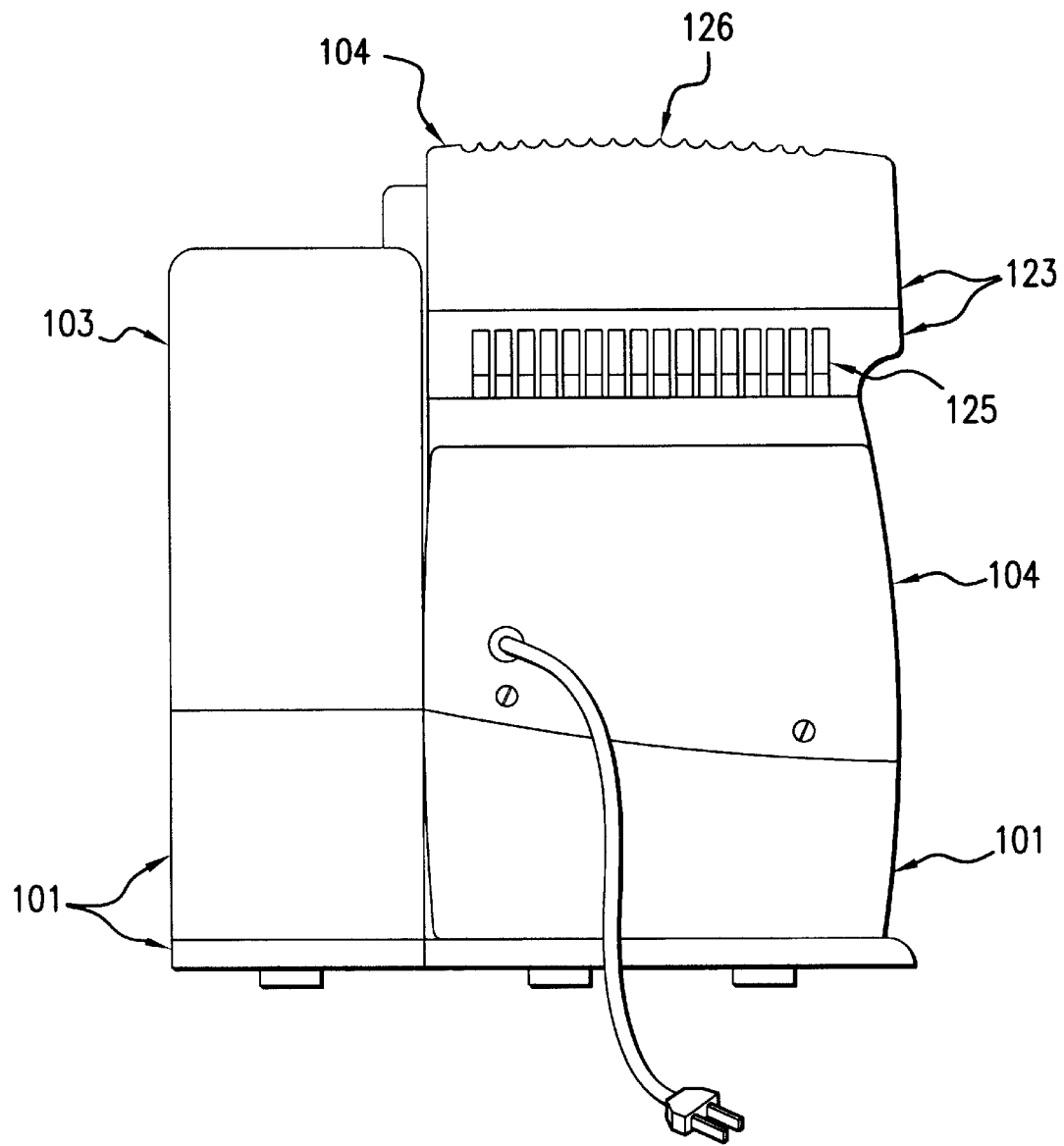
FIG. 4 is a left-side view of the embodiment of FIG. 1.
Figure 5:
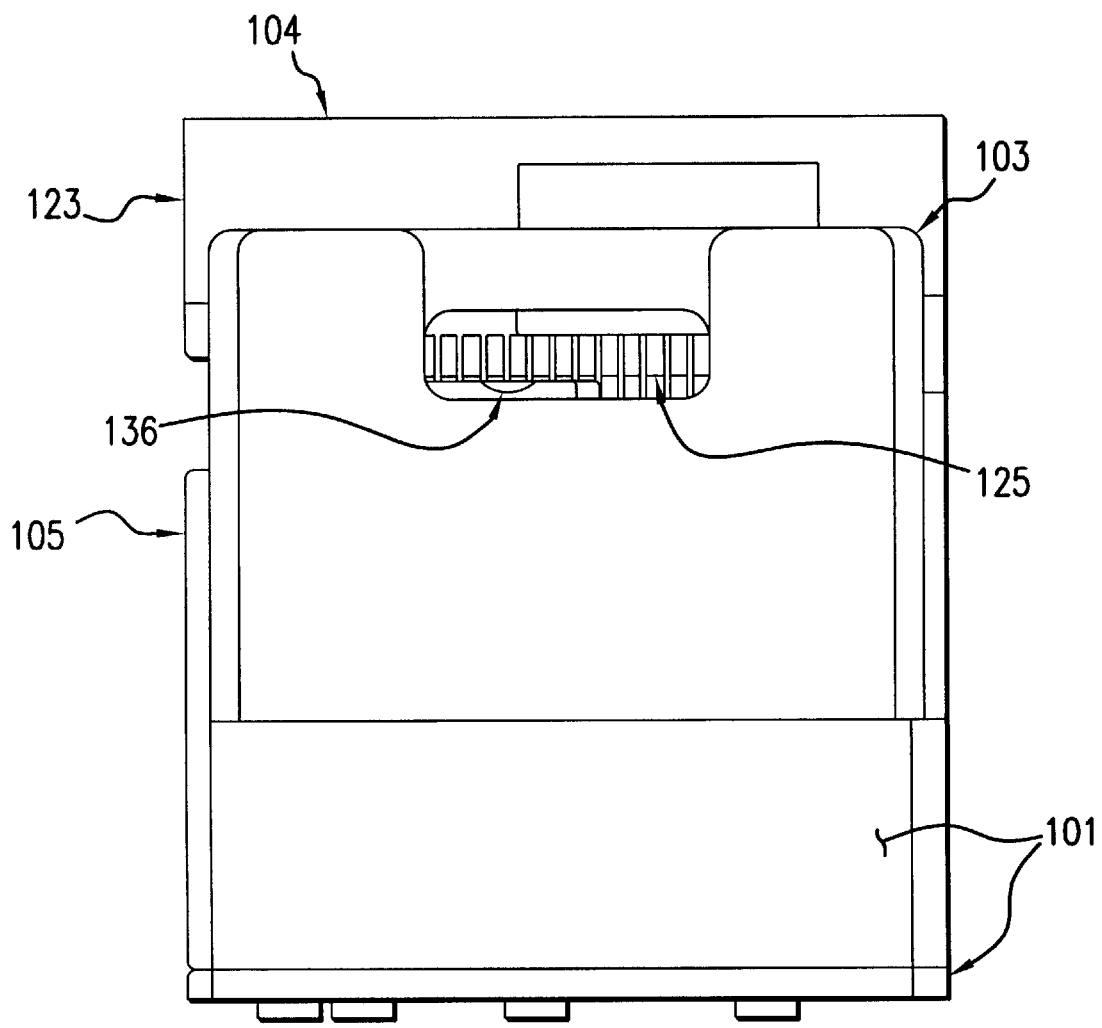
FIG. 5 is a back view of the embodiment of FIG. 1.
Figure 6:
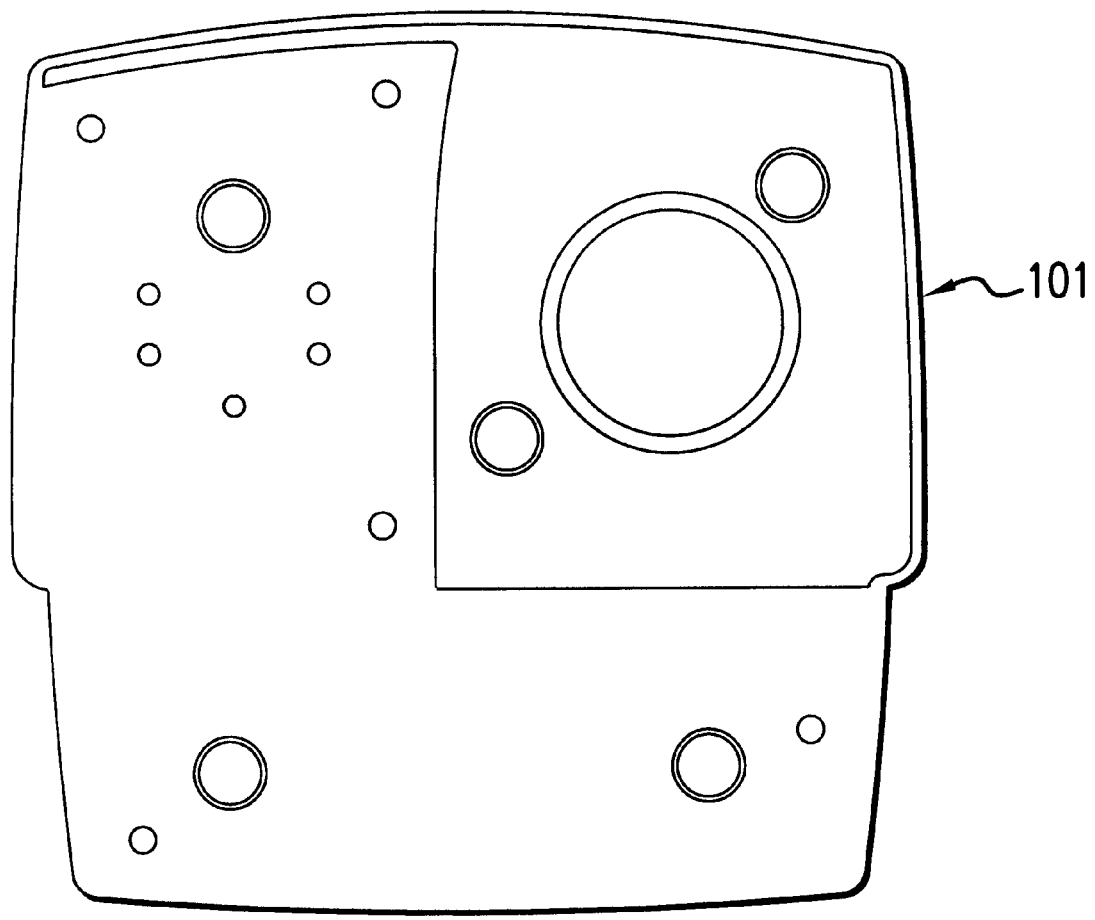
FIG. 6 is a bottom view of the embodiment of FIG. 1.
Figure 7:
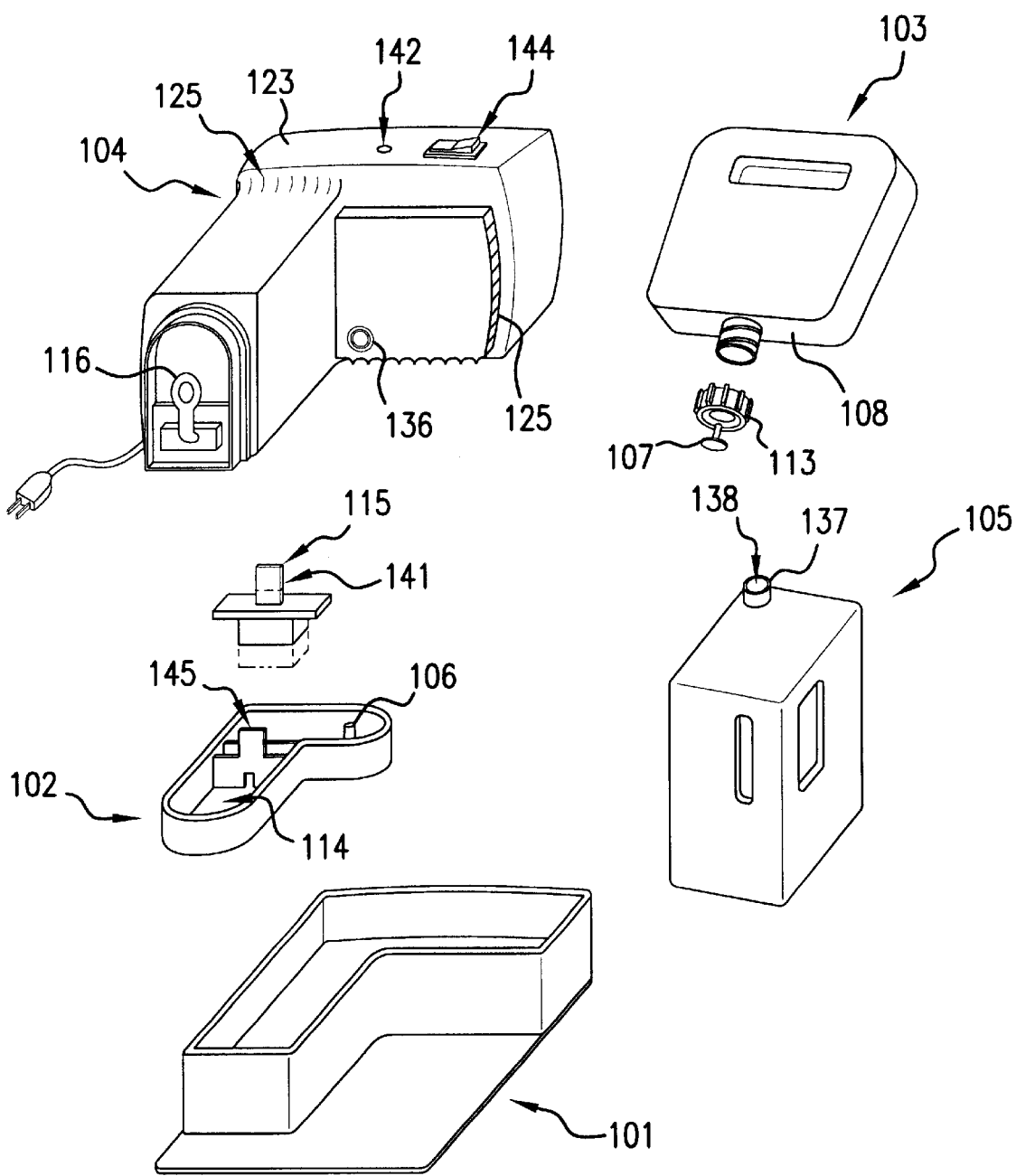
FIG. 7 is an exploded view of the embodiment of FIG. 1.
Figure 8:
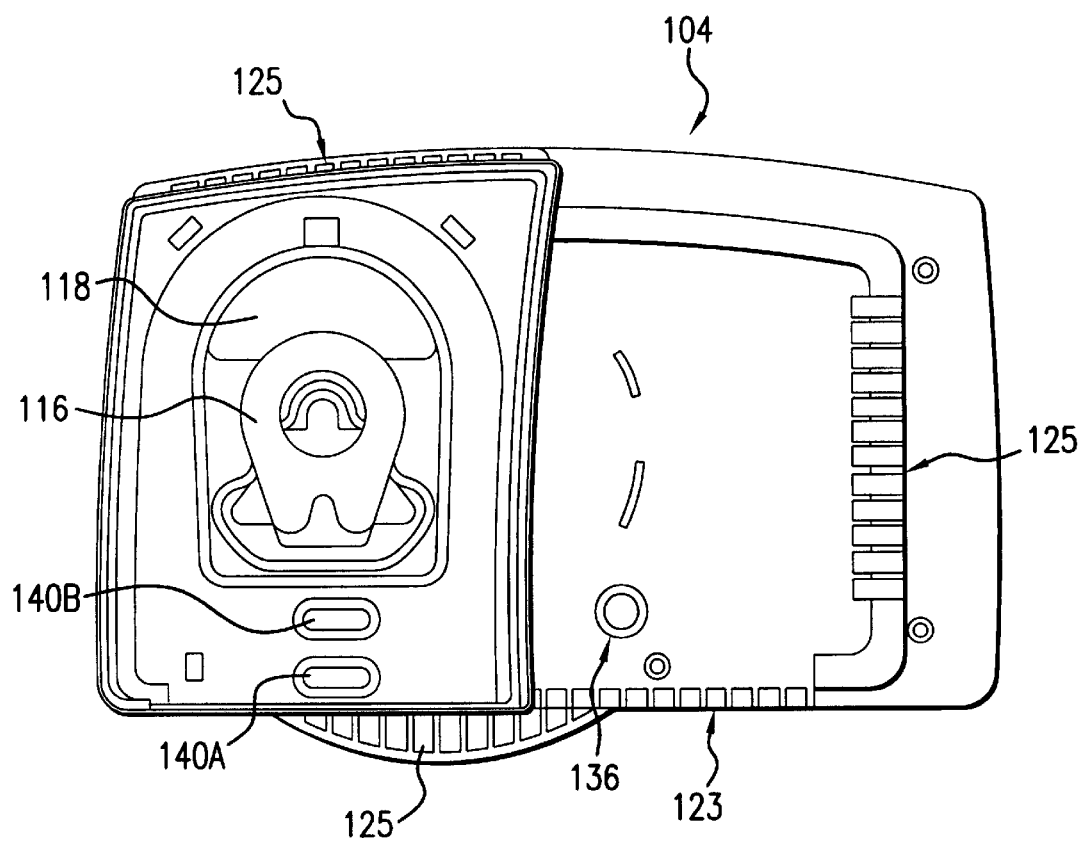
FIG. 8 is a bottom view of the mist chamber of the embodiment of FIG. 1.
Figure 9:
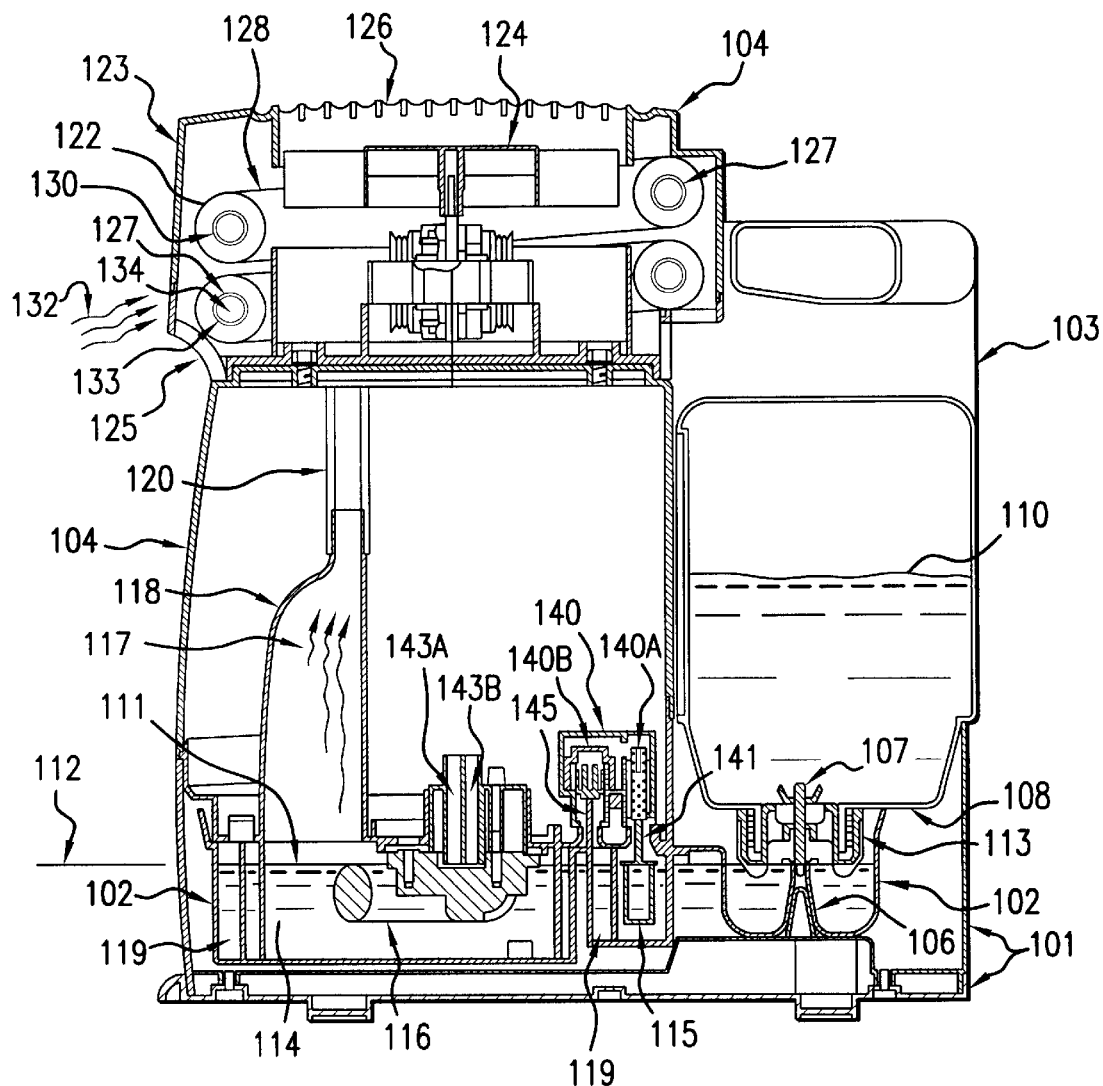
FIG. 9 is a sectional view taken at A—A of FIG. 1.
Figure 10:
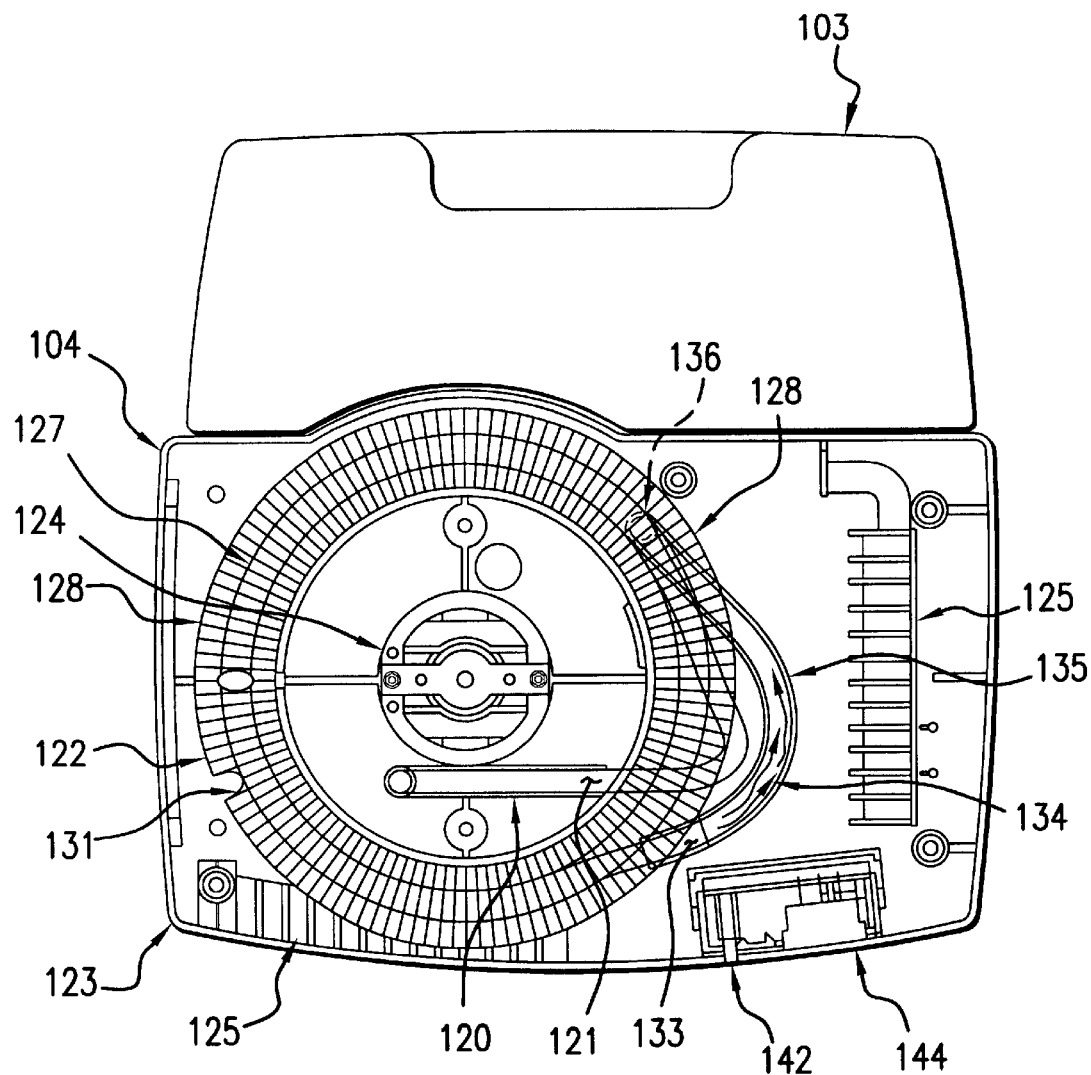
FIG. 10 is a top view of the embodiment of FIG. 1 with the topmost surface of the mist chamber and the fan blade removed.
Figure 11:
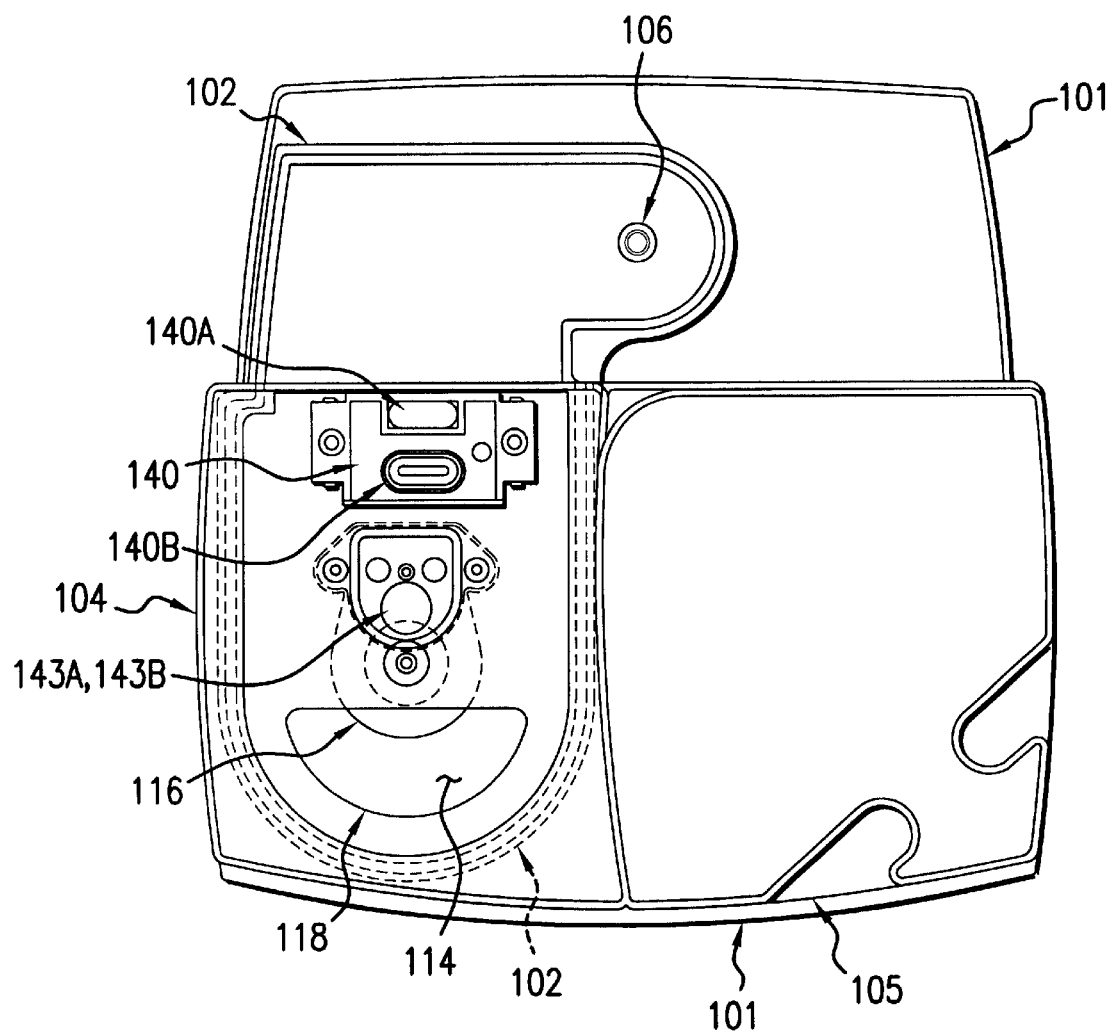
FIG. 11 is a sectional view taken at B—B of FIG. 1.
Figure 12:
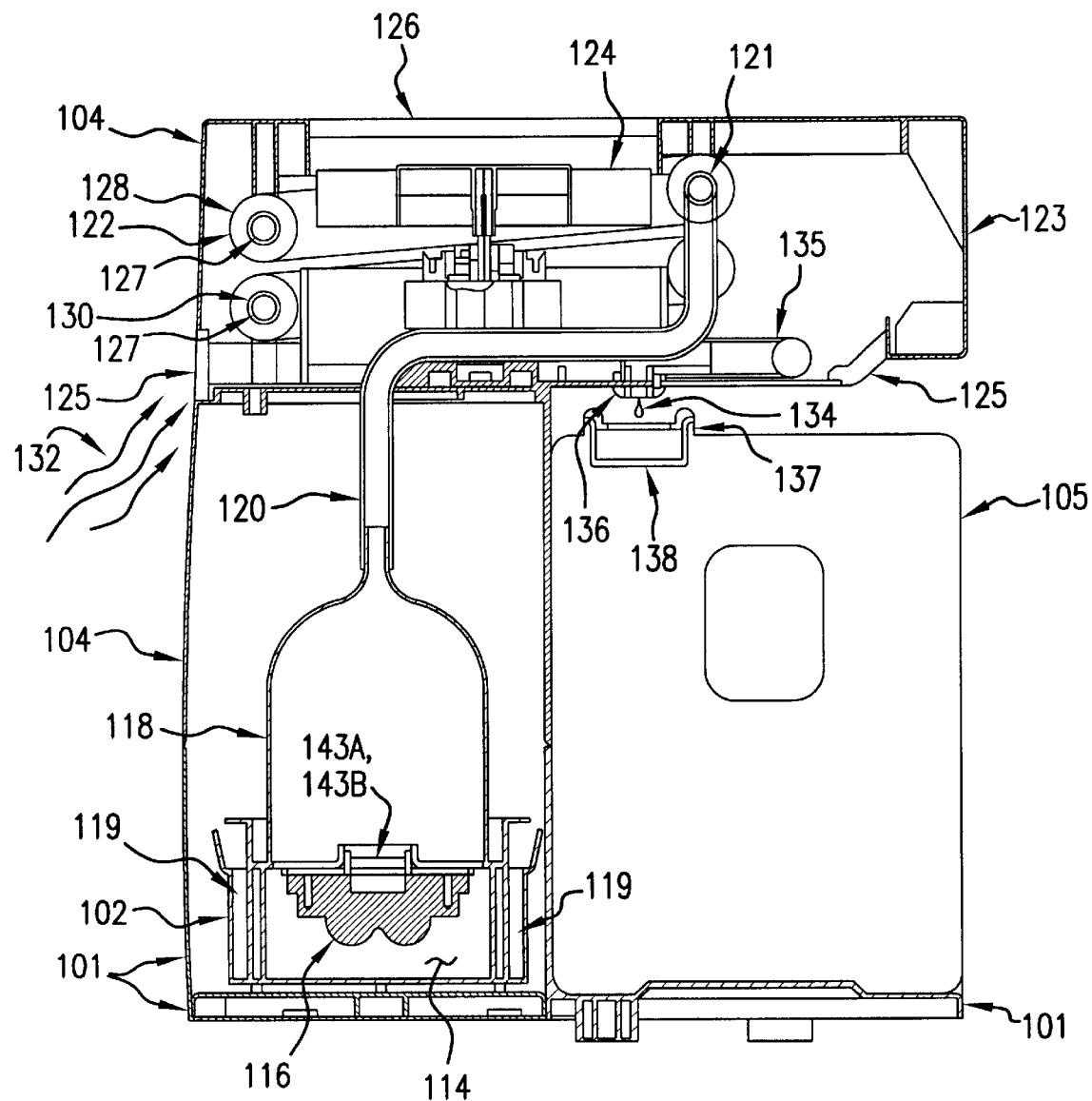
FIG. 12 is a sectional view taken at C—C of FIG. 2.
Figure 13:
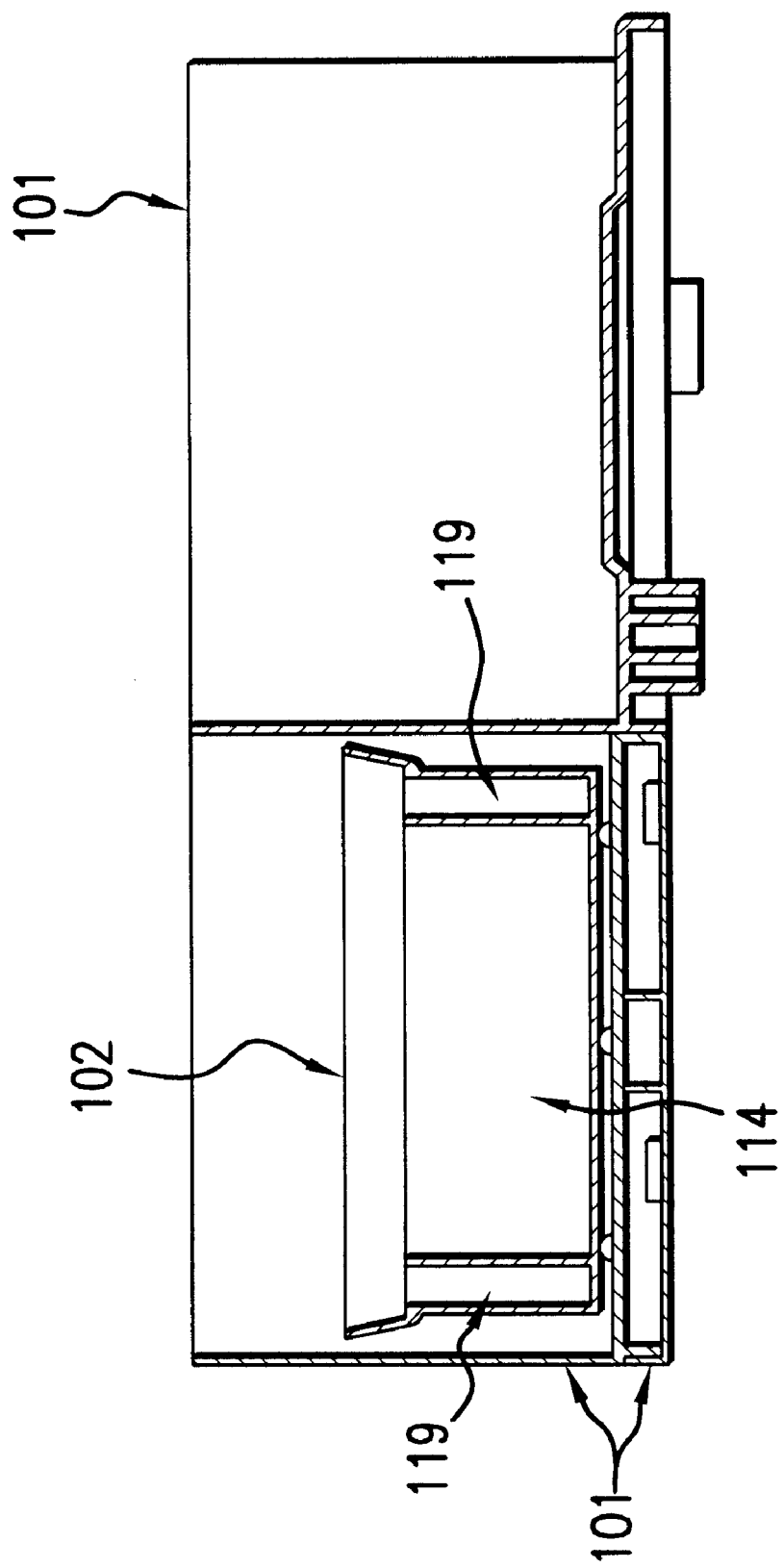
FIG. 13 is a sectional view though the base and water tray of the embodiment of FIG. 1.

Referring to FIGS. 1–14, base 101 is adapted to locate and support water tray 102, fill tank 103, mist chamber 104, and reservoir tank 105.

The water tray is comprised of a material tolerant of moisture and high temperature, such as polypropylene. It includes an actuator pin 106 for opening valve 107 at the base 108 of the fill tank, which allows unprocessed water 110 to flow from the fill tank as in-process water 111 and fill the water tray to an operating level 112 set by the valve body 113. The valve is configured to permit air to enter the fill tank therethrough as water escapes from the tank therethrough, while the water level is below the operating level. Once the water level reaches the operating level, access for air to pass into the tank becomes blocked and water can no longer escape from the tank. As in-process water is depleted from the tray by the boiling process (to be described), the air pathway through the valve is re-opened and more water can escape from the tank to replenish the in-process water boiled off. The in-process water flowing from the fill tank enters the boiling chamber portion 114 of the water tray after passing traveling through a circuitous path 109 within a labyrinth channel 109 which surrounds the boiling chamber. The water tray also includes a float/probe 115 which rises and falls with the in-process water level. Its function will be described further herein.

Directly above the boiling chamber portion of the water tray is positioned the mist chamber, resting on the periphery of the base, and from which hangs heater 116 into the in-process water within the boiling chamber for boiling thereof and for thereby converting the in-process water into a steam and water vapor mixture 117. The mist chamber further includes a mist chimney 118 which funnels the rising mixture into a mist tube 120, preferably made of a temperature and moisture tolerant flexible material such as silicone rubber. The mist tube channels the mixture into the uppermost end 121 of condensation coil 122.

The condensation portion 123 of the mist chamber includes a motor-driven cooling fan 124, the condensation coil, and intake 125 and exhaust 126 grills. The condensation coil comprises a helically coiled rigid tube 127 fitted within a continuous series of heat-convecting fins 128. The condensation coil and fins are preferably made of a material having good rigidity and thermal conductivity, yet being form-able for shaping, such as aluminum or copper. The convection fins are preferably comprised of a multitude of thin plates having holes 130 punched therethrough and thereby adapted for being press-fitted over the rigid coil so that good thermal contact is made between the fins and the rigid tube for optimal heat conduction. Each fin hole includes an axial neck portion 131 which serves both to increase heat-conducting surface contact with the rigid tube and also to evenly space each fin from the next for maximum heat convection therefrom. The intake and exhaust grills are positioned such that cool air 132 pulled by the fan passes over and cools the condensation coil and causes the warm mixture which has entered the uppermost end of the coil to cool and condense within. The condensed mixture, now in liquid form, runs downwardly within the helically wound rigid tube as it is further cooled, and flows therefrom out the lowermost end 133 of the condensation coil. Purified water 134 flowing from the condensation coil is channeled by an exit tube 135 to a drip nozzle 136 and drips therefrom to exit the mist chamber.

The reservoir tank rests on the back side of the base and has a neck 137 at its top with a fill hole 138 therethrough. The fill hole is just below the drip nozzle so that purified water dripping from the drip nozzle fills the reservoir tank. It can be removed from the appliance completely and used as a serving pitcher with the fill hole functioning as a pour opening. The neck can also accept a cap (not shown) to cover the fill hole.

Figure 15:
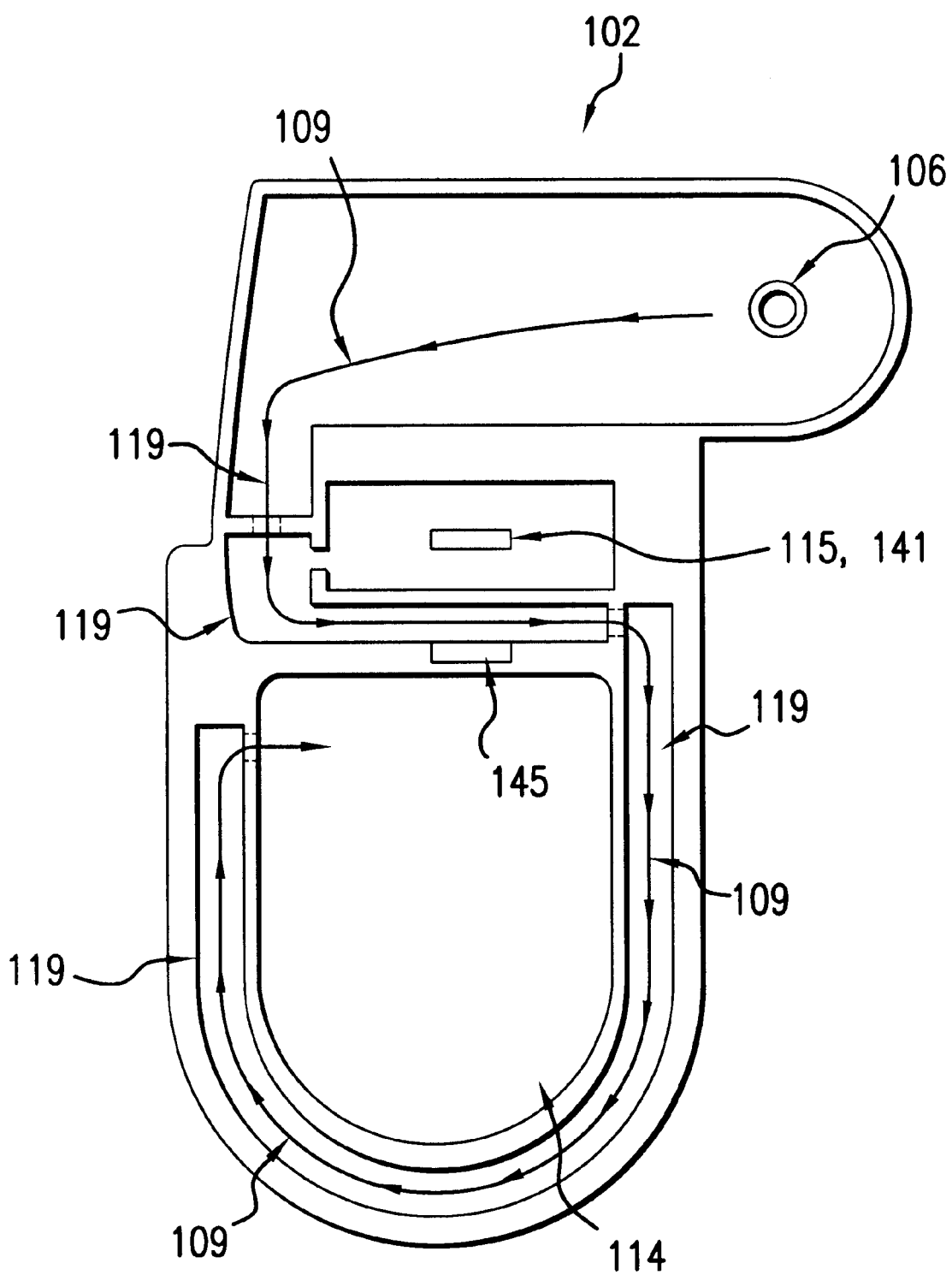
FIG. 15 is a top view of the water tray assembly, including the float/probe, of the embodiment of FIG. 1.

As seen best in FIG. 15, the water tray includes a labyrinth channel 119, which forces the in-process water flowing from the fill tank to the boiling chamber to follow a circuitous path 109. This labyrinth channel serves two functions. Firstly, the hot water of the boiling chamber is better insulated from the fill tank by this circuitous path than would be from a more direct path to avoid heating of the unprocessed water in the fill tank. Such inadvertent heating of the unprocessed water in the fill tank would cause an increase in pressure within the fill tank and force more unprocessed water from the fill tank to over-fill the water tray, above the operating level, which could lead to inefficient operation or spillage. Secondly, the in-process water in the labyrinth channel is pre-warmed as it flows around the perimeter of the boiling chamber to pre-evaporate the more volatile impurities from the in-process water. Such pre-evaporated impurities have no access into the mist chimney and are carried directly from the mist chamber and out of the distiller by the fan without polluting the purified mist in the chimney and condenser, thereby increasing the purification efficiency of the distiller.

The present invention has several additional features which improve safety and function. Firstly, the general construction provides that the electrical components are all located above and separated from the in-process water. This ensures that live parts cannot be wetted and short-circuited, and eliminates any dependence on seals and gaskets to separate the electrical parts from the water. Such seals, which would hypothetically need to be tolerant to moisture, high temperature, and mineral build-up, have historically been unreliable in other water heating appliances.

Secondly, the fan and heater are energized through micro-switch assembly 140, located within the mist chamber and comprised of float switch 140A and separation switch 140B. With the mist chamber properly seated on the base and the water tray in place, tray/probe 145 extends into the mist chamber to actuate and close the separation switch. As the float/probe rises with the incoming in-process water, it's probe portion 141 extends into the mist chamber to actuate and close the float switch and energize the heater and fan. As the water level falls through use and the float/probe falls with it, the float switch reopens and the heater and fan are de-energized. This is a safety feature which does not allow the heater to operate unless the water tray is filled, and facilitates the illumination of a "Ready/Refill" LED 142 to signal the user that the fill tank is empty and/or the distillation process is complete.

Thirdly, as the mist chamber may be removed from the base, such as for cleaning, and will thereby expose the heater, this aforementioned micro-switch assembly also provides for de-energization of the exposed heater by opening the separation switch as the switch and tray/probe are separated.

As an alternate to the aforementioned micro-switch embodiment, it is anticipated that a pair of probes depending from the mist chamber into the in-process water with associated low-voltage circuitry could provide an equivalent function by sensing the conductivity of water at the operating level and the relationship of that water level to the mist chamber by recognizing the presence or absence of that water between the probes. Such water sensing probes are well known in other arts and easily adaptable to this art.

A thermal safety feature is also provided wherein the heater is connected electrically in series with dual thermal-protectors 143A and 143B which are mounted physically against the heater and in a configuration that provides for good thermal conductivity therewith. The thermal-protectors sense an abnormally high heater temperature such as would occur if the float/probe/micro-switch feature was to fail and the heater was to inadvertently operate "dry". Although the heater temperature during normal operation is limited by the maximum temperature of boiling water, if either of the float or separation switches were to fail to de-energize the heater in the absence of water or removal of the mist chamber, the heater's temperature would quickly rise further. When the lower rated thermal-protector 143A senses such an abnormally high heater temperature, it opens the circuit to the heater and thereby de-energizes it. This lower rated protector is an auto-resetting type which will automatically re-close as it cools. In a case such as tampering, the lower rated protector will open before a dangerous condition occurs, while protecting the distiller from permanent damage. If, and only if, the lower rated thermal protector was to fail to open properly, higher rated protector 143B, a one-time thermal fuse, will open permanently disabling and thereby destroying the defective distiller. This is an important "back-up" safety feature.

Figure 14:
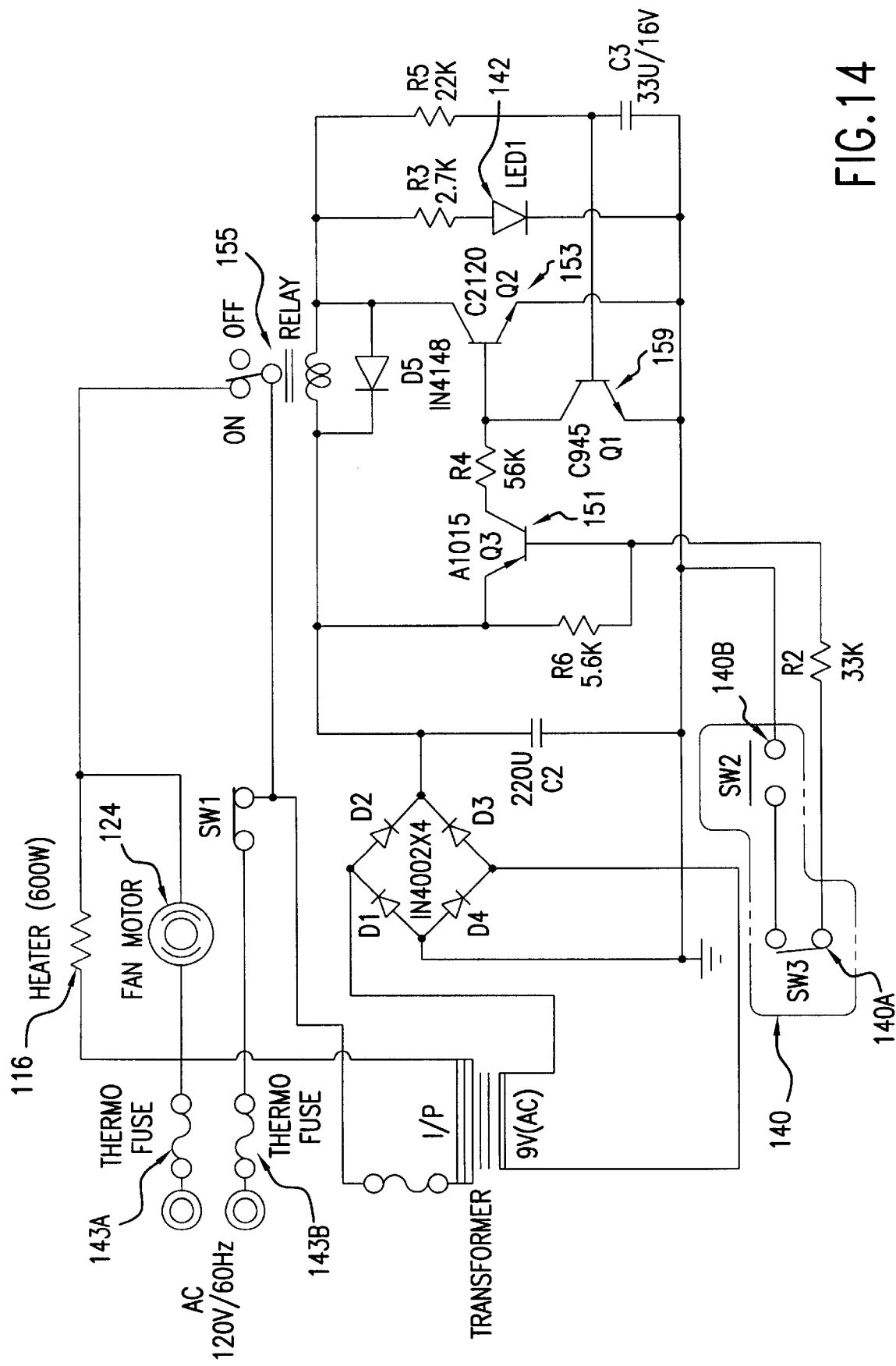
FIG. 14 is an electrical circuit diagram of the embodiment of FIG. 1.

To best understand the electrical functions of the present invention, reference is made to the circuit diagram provided in FIG. 14. During normal operation, with the mist chamber properly positioned on the base, the water tray in place, and the water level at the operating level, both float switch 140A and separation switch 140B are closed, causing transistor 151 to conduct, thereby causing transistor 153 to conduct so that relay 155 is energized and the heater 116 and fan 124 are therefore energized. The opening of either switch 140A or 140B opens transistor 151, thereby opening transistor 159 and opening transistor 153 so that the relay is de-energized to thereby de-energize the heater and fan and light "Ready/Refill" LED 142. As can be seen, the opening of either thermal protector 143A or 143B will cut-off one of the main electrical supply lines to the circuit.

Clean-up of the appliance is eased by the modular disassembly of the water-contacting components. The fill tank and reservoir may be removed, partially filled with a cleaning agent, and rinsed out. The mist chamber can be removed and the exposed heater can easily be cleaned with a de-scaling chemical. The water tray can be removed and placed into an automatic dishwasher.

As evidenced by the above description, the present invention provides novelty and improvement to the art by including advanced safety features, improved and simplified user interface, improved reliability, energy efficiency, environmental benefits, and easier cleaning capabilities.

I claim:

1. A distilling device for converting unprocessed water into purified water and comprising:
   - a fill tank for holding said unprocessed water,
   - a base comprising;
     - a water tray, removable therefrom, and comprising;
       - a fill chamber for receiving said unprocessed water from said fill tank;
       - a boiling chamber, and
       - a channel for directing said unprocessed water from said fill chamber into said boiling chamber, and comprising a portion thereof adjacent to said boiling chamber and in thermal communication therewith, and for pre-warming said unprocessed water for evaporating volatile impurities therefrom, and
     - a float disposed in said unprocessed water for rising and falling with the level thereof,
   - a mist chamber disposed above said base and removable therefrom and comprising;
     - a heater depending therefrom into said boiling chamber to boil said unprocessed water therein and to convert said unprocessed water into a purified steam rising therefrom,
     - a condensation coil having a tubular hole therethrough,
     - a mist chimney for channeling said rising steam from said boiling chamber into said tubular hole, and
     - a cooling fan for pulling outside air into said mist chamber and across said condensation coil for cooling said condensation coil and said steam therein, thereby causing said steam to condense therein into purified water,
   - a switch associated with said float and having an active state for enabling said heater and an inactive state for disabling said heater, wherein said float causes said switch into said inactive state during either the absence of said unprocessed water or the removal of said mist chamber from said base, or both, and
   - a reservoir tank for collecting said purified water from said condensation coil and comprising a serving pitcher.

2. A distilling device as in claim 1, wherein said channel portion substantially surrounds said boiling chamber.

3. A distilling device as in claim 1, wherein said channel comprises a labyrinth configuration for reducing thermal communication between said fill chamber and said boiling chamber.

4. A distilling device as in claim 3, wherein said channel portion substantially surrounds said boiling chamber.

* * * * *